United States Patent [19]

Morita

[11] Patent Number: 4,647,785

[45] Date of Patent: Mar. 3, 1987

[54] FUNCTION TEST MEANS OF PHOTOELECTRIC TYPE SMOKE DETECTOR

[75] Inventor: Toshikazu Morita, Tokyo, Japan

[73] Assignee: Nohmi Bosai Kogyo Co., Ltd., Tokyo, Japan

[21] Appl. No.: 593,110

[22] Filed: Mar. 26, 1984

[30] Foreign Application Priority Data

Apr. 8, 1983 [JP] Japan .............................. 58-61023

[51] Int. Cl.[4] .............................. G01N 15/06

[52] U.S. Cl. .............................. 250/574; 250/205; 340/630

[58] Field of Search .............. 250/573, 574, 575, 205; 340/630; 356/438, 338–343

[56] References Cited

U.S. PATENT DOCUMENTS 3,736,431 5/1973 Childs .............................. 250/205

4,206,456 6/1980 Malinowsky et al. .............. 250/574

4,555,634 11/1985 Muggli et al. .................... 340/630

*Primary Examiner*—David C. Nelms

*Attorney, Agent, or Firm*—Werner W. Kleeman

[57] ABSTRACT

A photoelectric smoke detector is provided with first and second radiation emitters and first and second radiation receivers. The first emitter emits pulsed radiation at a predetermined frequency. The second emitter emits pulsed radiation at twice this frequency. The first receiver receives the radiation of the second emitter directly and that of the first emitter by scattering only. When the first receiver receives alternate detection pulses reinforced by scattered radiation, an alarm is generated. The second receiver receives radiation directly from the first emitter and modulates the radiation output level of the second emitter proportionately. When the first receiver receives testing pulses between the alternating detection pulses, their level is discriminated to determine the functional state of the detecting elements and a corresponding function signal is generated.

3 Claims, 3 Drawing Figures

FUNCTION TEST MEANS OF PHOTOELECTRIC TYPE SMOKE DETECTOR

BACKGROUND OF THE INVENTION

The present invention broadly relates to a function testing means for a photoelectric type smoke detector.

The present invention relates to a function testing means for a photoelectric smoke detector comprising a light-emitting element for detecting smoke, a light-receiving element for detecting smoke located at a position where the light from the light-emitting element is not directly received, a light-receiving element for supervision or monitoring which receives the light output of the light-emitting element for detecting smoke, and a light-emitting element for testing which emits a light output, corresponding to the received light output of the monitoring light-receiving element, to the light-receiving element for detecting smoke.

A photoelectric type smoke detector (hereinafter called a detector) could fail to give an alarm because of dirt or residue on the light-emitting surface of the light-emitting element or on the light-receiving surface of the light-receiving element, or could generate a false alarm because of dirt or residue on the wall surface in the labyrinth for detecting smoke. Therefore, it is required by law to periodically test the operation or functioning of the detector.

As a testing means of this type, there has been proposed a testing means which consists of a first light source which constantly emits light, a first light-receiving element located at a position where the light ray from the first light source does not arrive or impinge directly, a second light-receiving element provided on the optical axis of the first light source as well as a second light source provided on the light-receiving axis of the first light-receiving element and emitting light by matching a control signal from a fire control panel with the output of the second light-receiving element. An operational or function test can be carried out by emitting light from the second light source directly onto the first light-receiving element.

With this testing means, however, the second light source emits light only when output is generated by the light-receiving element and a control signal is received from the control panel to carry out the test. Therefore, it does not constantly supervise or monitor functioning of the detector.

Moreover, the amount of light emitted from the second light-emitting element in the above described situation does not vary with the output of the second light-receiving element and is always constant. In addition, this known testing means simply checks whether the detector is operating or not, and it is not possible to know the momentary sensitivity of the detector.

If the detector does not have normal sensitivity, it could produce a fire alarm with no real fire (false alarm) or, conversely, fail to respond to a real fire (alarm failure). These are serious defects for such a detector.

SUMMARY OF THE INVENTION

Therefore, with the foregoing in mind, it is a primary object of the present invention to provide a new and improved construction of a function testing means for a photoelectric smoke detector which does not exhibit the aforementioned drawbacks and shortcomings of the prior art constructions.

Another and more specific object of the present invention aims at providing a new and improved function testing means which continuously supervises or monitors the functioning of the detector, which tests the detector to see whether it is operating properly and which also tests whether the sensitivity of the detector is within the normal range or not.

Another object of the present invention is to provide a means for testing the functioning of the detector by remote operation from a control panel or the like, without requiring direct access to the detector.

Yet a further significant object of the present invention aims at providing a new and improved construction of a function testing means for a photoelectric smoke detector of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the function testing means of the present invention is manifested by the features that the test mode or condition in which the light-emitting element for testing and the light-emitting element for detecting smoke concurrently emit light, and the smoke-detecting mode or condition in which only the light-emitting element for detecting smoke alone emits light are alternatingly generated and continuously supervising or monitoring the output of the light-receiving element for detecting smoke in each mode or condition described above.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
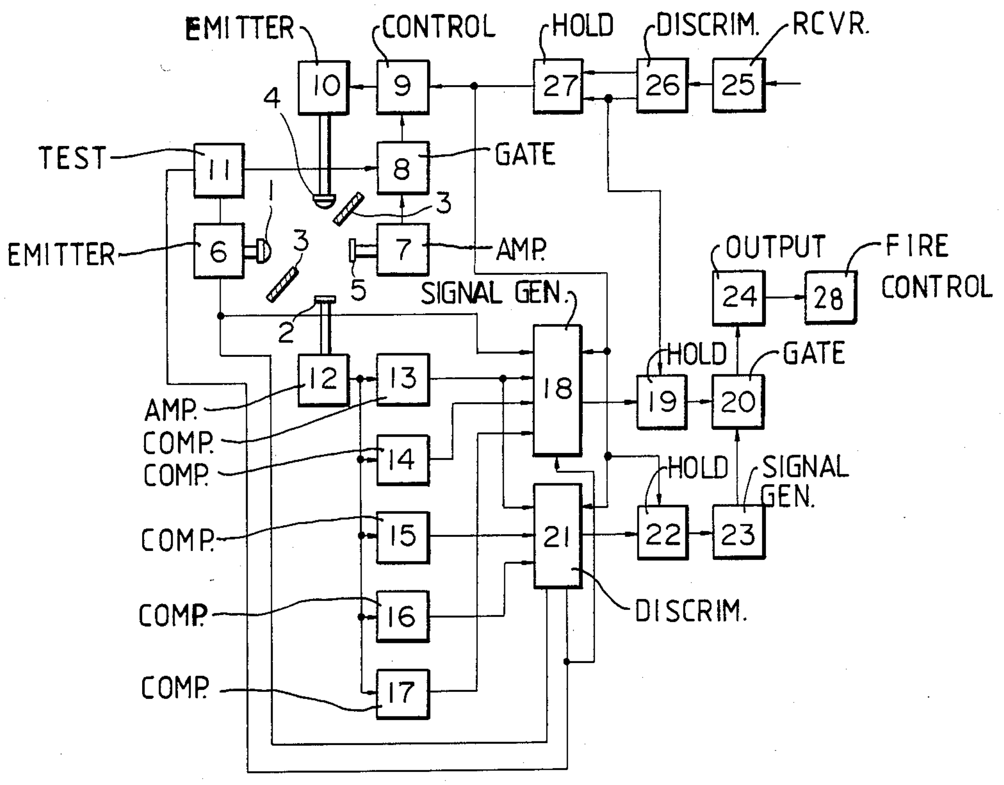
FIG. 1 shows a block diagram of one embodiment of the invention.

Describing now the drawings, it is to be understood that to simplify the showing thereof only enough of the structure of the function testing means for a photoelectric smoke detector has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise a light-emitting circuit 6 and a light-emitting element 1 for detecting smoke. Light from the light-emitting element 1 does not directly reach a light-receiving element 2 for detecting smoke because of a light-shielding plate or screen 3. The output of the light-receiving element 2 is converted to an electrical signal, which is amplified by an amplifier circuit 12 and transmitted to comparators 13–17. 13 is a comparator which detects a fire state or condition; 14 is a comparator for detecting an actual false alarm state; 15 is a comparator for detecting a potential false alarm state; 16 is a comparator for detecting a potential alarm failure state; and 17 is a comparator for detecting an actual alarm failure state. The threshold values of the comparators 13–17 are set according to the state to be detected by each respective detector defined by the comparators 13–17.

Comparators 13, 15 and 16 are connected to a function-discriminating circuit 21 which discriminates or detects whether the functioning of the respective detectors, is normal or not, and the discriminating output of the function-discriminating circuit 21 is held by a condition or state signal hold circuit 22. This discriminating output controls a signal-generating circuit 23. The comparators 13, 14 and 17 generating the condition or state signals are connected to a gate-control signal-generating circuit 18. The discriminating output of the gate-control signal-generating circuit 18 is held by a gate-control signal hold circuit 19. 20 is a gate circuit for signalling and when this gate circuit 20 is open, a detector functional state signal is sent to a control panel 28 through a signal output circuit 24.

5 is a light-receiving element for supervision or monitoring which directly receives the light from the light-emitting element 1. The output of this light-receiving element 5 is amplified by an amplifier circuit 7 and then transmitted to a gate circuit 8 for enabling the emission of light or radiation. A test mode switching circuit 11 and a light-emission control circuit 9 are connected to the gate circuit 8. The output of the light-emission control circuit 9 is transmitted to a light-emitting circuit 10 and causes a light-emitting element 4 to emit light or radiation with a light output corresponding or proportional to the output of the light-receiving element 5. The light-shielding plate or screen 3 is disposed between the light-emitting element 4 and the light-receiving element 5 so that the light-receiving element 5 does not directly receive light or radiation from the light-emitting element 4.

Figure 2:
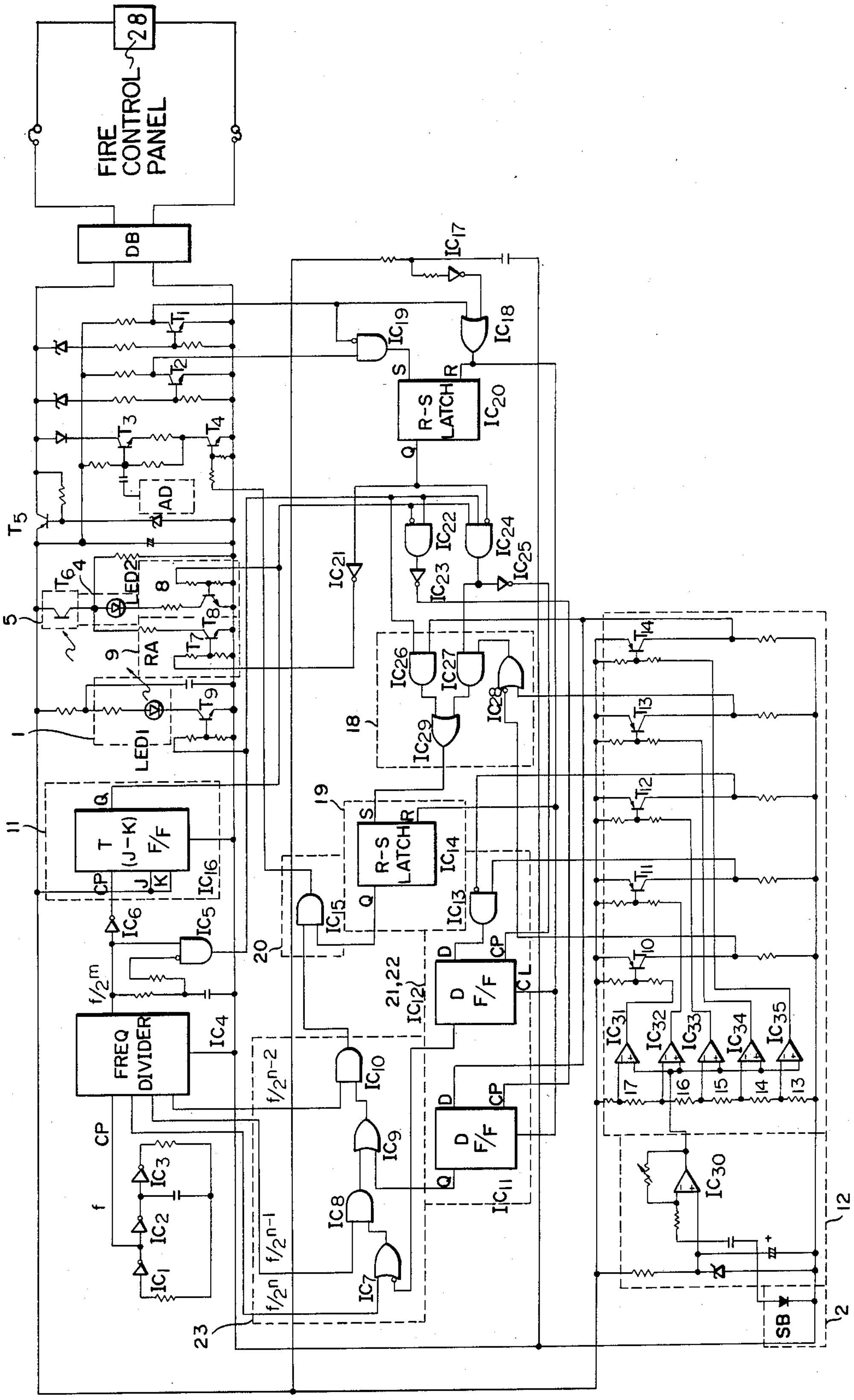
FIG. 2 shows a circuit diagram of FIG. 1.

When a call signal is sent from the control panel 28, it is received by a signal-receiving circuit 25, discriminated as a call signal by a received-signal discriminating circuit 26 and held by a call signal hold circuit 27 until a reset signal from the control panel is received. FIG. 2 is a circuit diagram of the embodiment shown in FIG. 1 and its operation will be explained in relation to the drawings.

A phototransistor $T_6$ of the light-receiving element 5 receives a light output of a $LED_1$ of the light-emitting element 1 and, while a transistor $T_8$ in the gate circuit 8 is conducting, feeds current corresponding or proportional to the light received to a $LED_2$ of the light-emitting element 4, which in turn emits light corresponding or proportional to the light output received.

On the other hand, the ON/OFF state of the transistor $T_8$ in the gate circuit 8 is controlled by the output of a J/K or T-type flip-flop $IC_{16}$ (smoke detection mode-test mode switching circuit 11) which receives a clock signal or timing pulse signal for driving the $LED_1$ of the light-emitting element 1.

Figure 3:
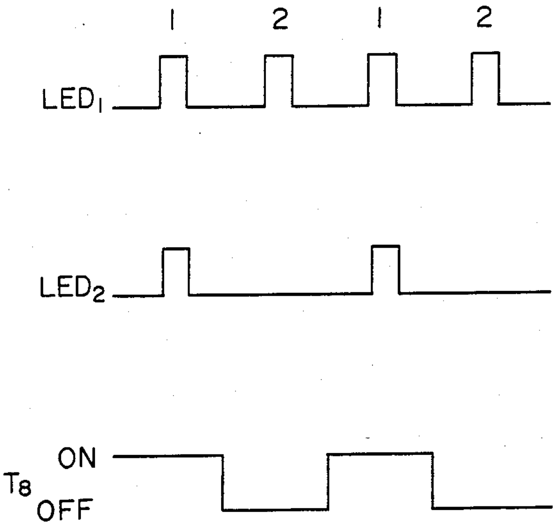
FIG. 3 shows a timing diagram relating to the embodiment of FIG. 1.

The $LED_2$ of the light-emitting element 4 therefore emits pulsed light or radiation with a pulse frequency twice that of the $LED_1$ of the light-emitting element 1, as shown in the timing diagram of FIG. 3.

Now, the conditions or modes in which both the $LED_1$ of the light-emitting element 1 and the $LED_2$ of the light-emitting element 4 are concurrently emitting light, and in which the $LED_1$ of the light-emitting element 1 is emitting light alone are respectively called the test mode or condition (1 of FIG. 3) and the smoke-detecting mode or condition (2 of FIG. 3). Functioning of the detector in each case is discriminated by means of the comparators 13–17, $IC_{35}$–$IC_{31}$ and transistors $T_{14}$–$T_{10}$ which discriminate the output of the amplifier circuit 12 ($IC_{30}$) obtained by amplifying the output of a solar or light-sensitive cell SB of the light-receiving element 2. Discrimination of the functioning of the detector is made on the basis of the output of the amplifier circuit 12 ($IC_{30}$) in the test mode or condition, and it is considered normal if the output lies between the threshold values of the comparators 15 and 16, and abnormal if the output is not within this range.

Now, signal transmission to the fire control panel 28 during the supervisory or monitoring mode or condition and the fire state or condition of the detector will be explained. In the supervisory or monitoring mode or condition, when a call signal is transmitted to the detector from the fire control panel 28, it is received by the signal-receiving circuit 25 and discriminated as a call signal by a transistor $T_2$ in the received-signal discriminating circuit 26, and then held by the call signal hold circuit 27 ($IC_{20}$) until the reset signal from the fire control panel 28 is received.

The output of the call signal hold circuit 27 ($IC_{20}$) is transmitted to a D-type flip-flop $IC_{12}$ of the function-discriminating circuit 21 and the condition or state signal hold circuit 22 to indicate that the call signal has been received, and the condition or state signal hold circuit 22 ($IC_{12}$) holds or stores the condition or state signal of the detector corresponding to its condition or state just before the call signal was received. At the same time a transistor $T_7$ of the light-emission control circuit 9 is rendered nonconductive to interrupt the current flowing through a resistor RA until the test condition or mode, thus increasing the light-emitting current of the $LED_2$ of the light-emitting element 4. Then, the comparator 13 ($IC_{35}$) is inverted to open the signal gate circuit 20 ($IC_{15}$) and the condition or state signal of the momentary detector function (i.e. signals $f/2^n$, $f/2^{n-1}$, $f/2^{n-2}$ generated by the signal-generating circuit 23) is sent to the fire control panel 28 from the signal output circuit 24. If the signal $f/2^n$ is sent to the fire control panel 28, the detector function is in a normal condition or state, and when the signal $f/2^{n-1}$ is sent, it is in an abnormal condition or state.

By the above described operation, not only a testing of the functioning of the optical system but also of the functioning of the circuits for sending out or transmitting signals can be concurrently carried out. Even if no call signal is sent from the fire control panel 28, large decreases or increases in output of the light-receiving element 2 (SB) from the normal value in the checking or testing mode or condition can cause the alarm failure or false alarm condition or state. In this case, the comparator 17 ($IC_{31}$) or 14 ($IC_{34}$) is inverted, and the gate-control signal-generating circuit 18 ($IC_{27}$) generates a signal, which is held or stored by the gate-control signal hold circuit 19 ($IC_{14}$). Then, the gate circuit 20 ($IC_{15}$) for signalling opens, and the abnormal signal $f/2^{n-1}$ from the signal-generating circuit 23 is sent out to the fire control panel 28.

When smoke enters a conventional smoke detecting chamber (not particularly shown) during a fire, light from the light-emitting element 1 ($LED_1$) is scattered by smoke particles and the output of the light-receiving element 2 (SB) in the smoke-detecting condition or mode is increased. When the comparator 13 ($IC_{35}$) is inverted, the gate circuit 20 ($IC_{15}$) for signalling is opened regardless of presence or absence of the call signal from the control panel, whereby the fire or alarm signal $f/2^{n-2}$ is sent to the fire control panel 28. After receiving the fire signal, the fire control panel 28 transmits a reset signal to the detector whenever necessary, and the operating state of the detector is reset.

Further, in FIG. 2, DB is a diode-bridge for nonpolarizing the detector, and AC is an address-signal generating circuit for modulating the output signal for the purpose of identifying the responding detector in case many detectors are connected to the same line. In such a case, the frequencies allocated to respective detectors differ from one another.

Since the present invention is constructed as described above, it can always monitor the functioning of the detector and test whether or not the detector operates properly. Moreover, it is possible to know precisely the condition or state of functioning of the detector by the output from the light-receiving element. Even in case an abnormal function condition or state occurs which may possibly lead to serious trouble, such trouble can be prevented beforehand, because the abnormal condition or state can be detected at any time and an abnormal signal is transmitted to the fire control panel 28 each time. Moreover, the following can be mentioned as additional advantages—the condition or state of the functioning of the detector can be tested by remote operation from the fire control panel 28, and test results are nearly the same as those obtained by the detector function testing method using smoke.

While there are shown and described present preferred embodiments of the invention, it is to be distinctly understood that the invention is not limited thereto, but may be otherwise variously embodied and practiced within the scope of the following claims. Accordingly,

I claim:

1. A function testing means for a photoelectric smoke detector, comprising:

a first light-emitting element for smoke detection;

a first light-receiving element for smoke detection by reception of light scattered from smoke arranged at a location shielded from direct irradiation by said first light emitting element and having an output;

a second light-receiving element for monitoring radiation emitted by said first light-emitting element and having an output;

a second light-emitting element for emitting radiation in proportion to said output of said second light-receiving element toward said first light-receiving element;

function testing means for operating the photoelectric smoke detector in a test mode in which said first light-emitting element and said second light-emitting element simultaneously emit radiation;

operational means for operating the photoelectric smoke detector in a detection mode in which only said first light-emitting element emits radiation;

switching means for alternatively performing said test mode and said detection mode; and monitor means for continuously monitoring said output of said first light-receiving element in each of said test mode and said detection mode.

2. The function testing means as defined in claim 1, further including:

alarm means for transmitting an exception-state signal to a fire control panel for generating a control signal if said output of said first light-receiving element deviates from a predetermined value when irradiated by said second light-emitting element.

3. The function testing means as defined in claim 2, further including:

reception means for receiving said control signal from said fire control panel; and said reception means being connected to power means connected to said second light-emitting element for causing said second light-emitting element to emit radiation in excess of a value which causes said output of said first light-receiving element to exceed said predetermined value.

* * * * *